US007036546B1

(12) United States Patent
Ripma

(10) Patent No.: US 7,036,546 B1
(45) Date of Patent: May 2, 2006

(54) STAMP/LABEL DISPENSER

(76) Inventor: Gordon R. Ripma, 142 Pine Hill Trail West, Tequesta, FL (US) 33469

( * ) Notice: Subject to any disclaimer, the term of this patent is extended or adjusted under 35 U.S.C. 154(b) by 0 days.

(21) Appl. No.: 10/356,160

(22) Filed: Jan. 31, 2003

(51) Int. Cl.
*B32B 31/00* (2006.01)

(52) U.S. Cl. ....................... 156/577; 156/574; 156/579

(58) Field of Classification Search ................ 156/540, 156/541, 543, 574, 577, 579; D19/66, 67; 221/25, 71, 72, 73
See application file for complete search history.

(56) References Cited

U.S. PATENT DOCUMENTS 2,912,140 A * 11/1959 Cole ........................... 221/70
3,727,868 A * 4/1973 Buchanan ................ 248/205.3
4,525,237 A * 6/1985 Clar ........................... 156/540
5,538,170 A * 7/1996 Van Luit ..................... 225/47
5,806,714 A * 9/1998 Geiger ........................ 221/73
6,460,800 B1 * 10/2002 Watanabe et al. ........ 242/598.5
6,681,830 B1 * 1/2004 Vulpitta et al. ............. 156/527

* cited by examiner

*Primary Examiner*—Mark A. Osele
(74) *Attorney, Agent, or Firm*—Norman Friedland

(57) ABSTRACT

A stamp/label dispenser generally kidney shaped that includes a circular pocket for holding a roll of stamps/labels and an interconnecting passage so that one end of the roll can be withdrawn through the mouth or end. The roll is of the type that includes a surface coated with a pressure adhesive and a removable backing sheet. Means are provide for loading the roll into the pocket and includes means for holding it therein. A wall opposite the loading side of the pocket lends itself to include visible indicia or a logo and the like. A guide is formed on the surface of the dispenser for the backing sheet where it is translated so as to allow the backing sheet to be removed from the coated surface and allow the user to place the stamp/label on the intended surface. A window formed on top end of the dispenser allows one to view the roll.

4 Claims, 2 Drawing Sheets

FIG. 1
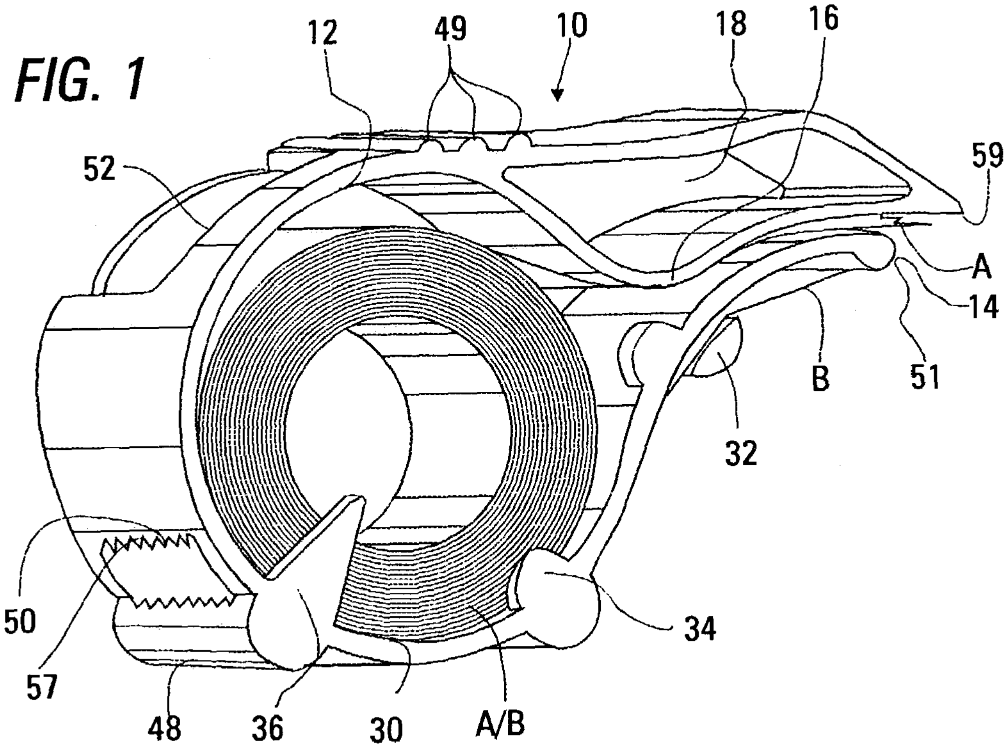
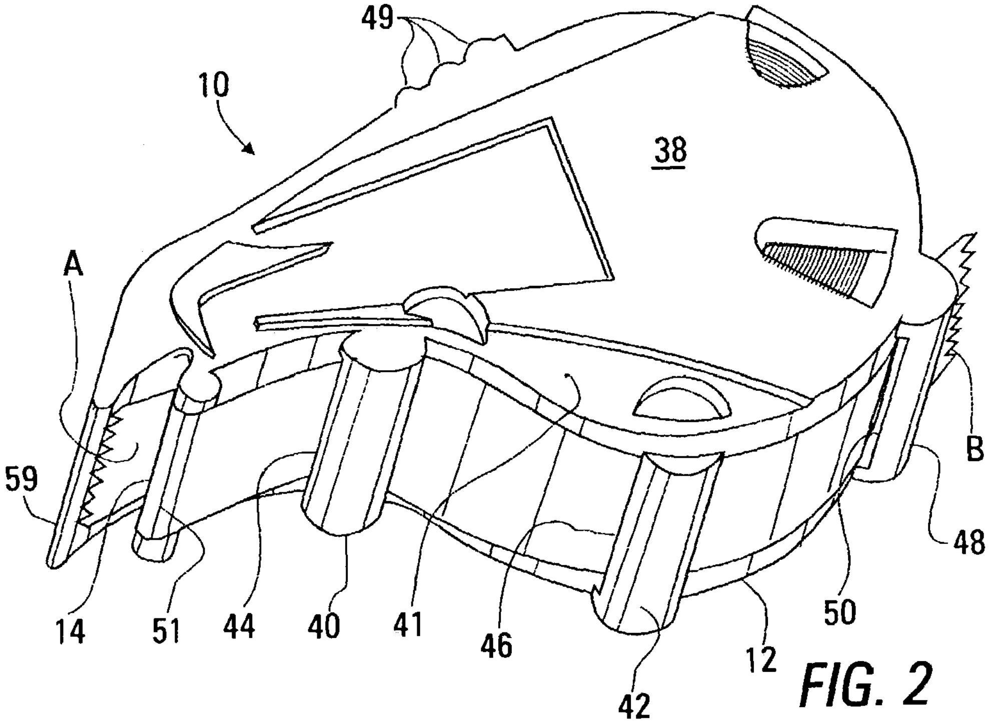
FIG. 2

STAMP/LABEL DISPENSER

TECHNICAL FIELD

This invention relates to a dispenser for holding stamps, labels and the like and particularly to the type that includes a pressure adhesive and a backing paper that is removable so that the stamp/label is utilized to stick onto something else.

BACKGROUND OF THE INVENTION

There are a sundry of label dispenser available in the marketplace and are of the type where the labels are contained in a disposable box-like container. These devices operate by allowing one to retract the label from the container and the action of removal releases the back surface from a sheet of backing paper. The back of the label that adheres to the backing paper is coated with a pressure adhesive. The pressure adhesive is of the type that allows the label to be stuck-on to another surface such as a paper document, much like the Highland® self-stick removable notes made by 3 M Commercial Office Supply Division of St. Paul, Minn. For example, removable pressure adhesive coated dots are contained in boxes and are dispensed in the manner described in the above and are commercially available and are manufactured by Alvin & Co., Inc., Corporate Office, P.O. Box 188, Windsor CT 06095. Likewise, pressure adhesive coated arrows mounted on backing paper are made by the Avery Label, Azusa, Calif., Elmhurst, Illinios, Gainesville, Ga., and New Brunswick, N.J. and are also dispensed in a similar manner. Like the dots, the boxes that hold the arrows are not reusable, but rather are disposable when the item is exhausted.

While this invention bears some similarity to the disposable stick on labels and/or dots, this invention is significantly different in that it is directed solely to the container that is re-usable and is particularly adapted and efficacious for dispensing mailing stamps that are available in rolls that are self-sticking and are removably affixed to a backing paper. However, labels can also be dispensed in the same manner as will be understood from the discussion to follow hereinbelow. However, this invention lends itself to be purchased with a roll of stamps contained therein and is reusable by merely purchasing a replacement roll. The container of this invention has the capacity for conveniently allowing the user to place the stamp directly on the envelope without first having to remove the stamp, although either method of removal from the container is an option available to the user. Additionally, the container of this invention lends itselfto place a logo or advertisement on one face of the container without impairing the use of the stamp removal capability. The invention is characterized as being simple to use, inexpensive to manufacture, is reusable, neatly stores the stamps/label, is conveniently available to the user and has a long life. In addition the stamp/label can be applied with the use of a single hand.

SUMMARY OF THE INVENTION

An object of this invention is to provide for a roll of stamps/labels of the type that is coated with a pressure adhesive and includes a removable backing sheet, a reusable dispenser that detaches the stamp/label from the backing sheet as it is withdrawn therefrom and allows the stamp/label to be applied to the surface where it is intended to be used as an option.

A feature of this invention is the provision of guides formed in the dispenser that serve to guide the backing sheet as the stamp/label is being removed therefrom.

A still further feature of this invention is the inclusion of a side opening in the dispenser allowing the roll of stamps/labels to fit into a cavity and having a closed opposite side surface that is suitable for placing indicia, logo and the like.

The foregoing and other features of the present invention will become more apparent from the following description and accompanying drawings.

BRIEF DESCRIPTION OF THE DRAWINGS

FIG. 1 is a perspective view looking at the inventive dispenser from the bottom for illustrating the details of this invention;

FIG. 2 is a perspective view looking at the inventive dispenser depicted in FIG. 1 from the top for illustrating the details of this invention;

Figure 3:
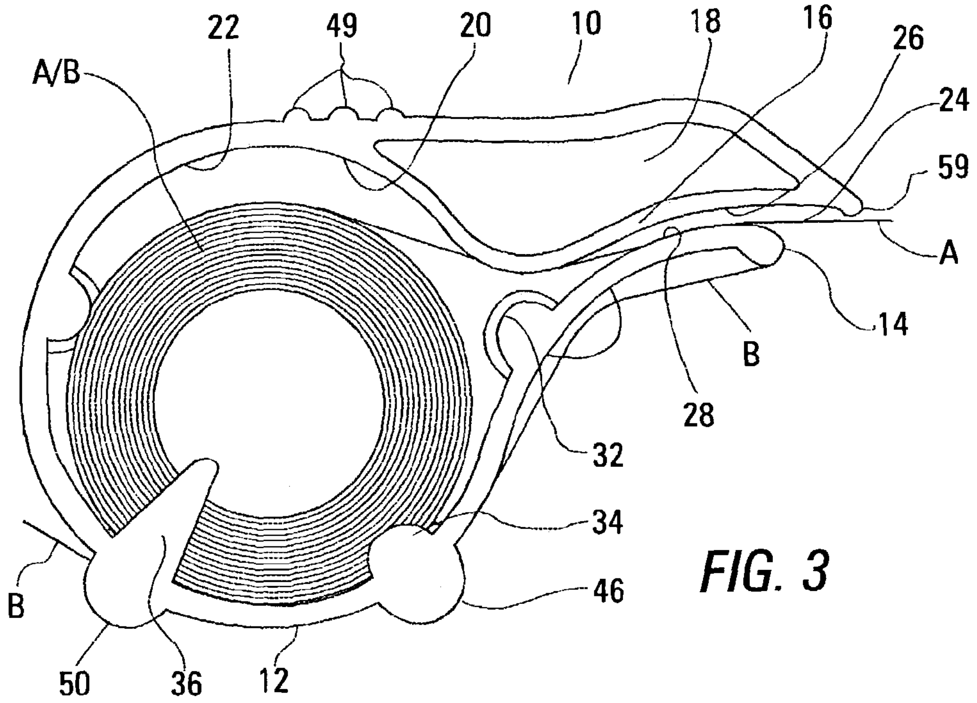
FIG. 3 is a sectional view in side elevation of the dispenser depicted in FIG. 1.

These figures merely serve to further clarify and illustrate the present invention and are not intended to limit the scope thereof.

DETAILED DESCRIPTION OF THE INVENTION

While this invention is being disclosed in its preferred embodiment as a dispenser for dispensing a roll of postage stamps of the type that includes a pressure adhesive coating on the back of the stamp and a removable backing sheet having a given dimension it is to be understood as will be obvious to one skilled in the art, that there is a wide latitude of dimensions and the invention is not limited to postage stamps. As for example, it can be used to dispense labels or identifiers that are formed in rolls with a coating of pressure adhesive and a backing sheet or the like.

Referring next to FIGS. 1–3 the dispenser generally illustrated by reference numeral 10 is formed in a general kidney outer shape with a circular pocket as will be more fully described hereinbelow. The dispenser 10 includes a generally curved configured outer wall 12 that extends from the mouth 14 of the dispenser and back to the mouth 14 defining a generally kidney shaped member. The portion of the outer wall 12 is bifurcated to define a bulbous portion 16 leaving a hollow section 18. The bulbous portion 16 serves a dual purpose, namely, it defines with the inner diameter 20 of wall 12 a generally circular pocket 22 and a channel 24 defined between the inner surface portion 26 of outer wall 12 and the complementary inner surface portion 28, which is radially spaced from the inner surface portion 26.

As is apparent from FIG. 1, the circular pocket is adapted for the roll of stamps to fit therein and is loaded from the bottom face 30. The generally partially circular tabs 32, 34 and 35 serve to hold the roll of stamps from falling out as does the triangular shaped tab 36. It will be appreciated that the roll is compact and its diameter is sufficiently smaller than the diameter of the circular pocket 22 and once inserted, it will tend to unwind and expand to a diameter that is sufficient for the tabs to hold it from falling out. The back wall 38 extending from the mouth to the back portion, i.e. the portion remote from the mouth 14 is a full wall and serves to prevent the roll from falling out from the opposite side to the loading portion. In addition, the front face of back wall 38, i.e. the face away from the pocket 22, may serve to carry indicia or a logo or other legend that can be attached thereto or the legend or logo can be embossed thereon, similar to what is shown in FIG. 2.

In accordance with this invention, a guide is provided that serves to allow the backing sheet to be translated once the stamp is removed therefrom and movement of the back sheet will sequentially advance the stamps. The portion adjacent the portion of the outer wall that is shorter than the other portion of the outer wall defining the mouth 14, carries, say three (3) depending guide posts extending the width of the outer wall 12 or at least the width of the stamps being dispensed. Two of the guide posts 40 and 42 are formed integral at one end to the outer wall 12 and includes a lateral extending portion that is slightly spaced from the surface of outer wall 12 defining slots 44 and 46. The third guide post 48 is similarly shaped but is attached at either end thereof to the outer wall 12 and is slotted between the ends thereof to define the slot 50. The aft edge 57 of the guide post 48 may be serrated or sharpened to facilitate the cutting off of the back sheet as it is pulled out of the dispenser. (The bottom of the guide posts are located relative to the wall to allow the apparatus to stand on end). The laterally extending and axially spaced projections 49 (say, three in number), located at the top of the dispenser 10 serve as a thumb rest and is designed to prevent the thumb from slipping when the dispenser is being used.

It will be appreciated from all the Figs. that the shorter portion of the outer wall adjacent to the mouth 12 includes a generally partially cylindrically shaped portion 51 which serves to allow the backing sheet to be drawn from the coated surface of the stamp. The backing sheet continues to be translated through the slots 44, 46 and 50. The user can pull the backing sheet from the end of slot 48 or optionally translate the roll via the aperture 52. The aperture 52 formed on the outer wall 12 remote from the guide posts is an opening that is exposed to the outer portion of the roll of stamps and essentially, is a window to view the contents of the dispenser, and allows the user to frictionally translate the stamps toward the mouth 14.

By virtue of this invention, the user can apply the stamp to the intended surface, such as an envelope, where it is contacted so that the user does not have to handle the stamp, if so desired. The nose 59 extending beyond the cylindrically shaped portion 51 facilitates the action of applying pressure to the stamp for causing it to adhere to the intended surface.

Obviously, and as one skilled in this art will appreciate, the dispenser can be made from any material but preferably from a synthetic material, such as plastic or nylon or the like and can be transparent or opaque, as desired.

Although this invention has been shown and described with respect to detailed embodiments thereof, it will be appreciated and understood by those skilled in the art that various changes in form and detail thereof may be made without departing from the spirit and scope of the claimed invention.

What is claimed is:

1. A stamp/label dispenser adapted to dispense stamps or labels supplied in a roll thereof consisting of a series of stamps/labels coated on one surface with a pressure adhesive and having a backing sheet, said stamp/label dispenser including a curved outer wall formed in a generally kidney shape having one end portion thereof being shorter than the other end thereof and defining a mouth and a channel portion, the outer wall including an included portion for defining a generally circular shaped inner pocket for receiving the roll, one face of said dispenser being opened to allow the roll to be inserted into said pocket, guide means formed on said wall including slotted portion for guiding said backing sheet and allowing the backing sheet to be withdrawn in a direction away from the travel of the stamp/label and advancing the stamp/label through said channel as it separates from the backing sheet and allowing the user to apply the stamp/label on the intended surface as it discharges from said stamp/label dispenser, the top surface of said curved outer wall located to accommodate the placing of the thumb of the hand of the user when said stamp/label dispenser is being used and adapted to apply pressure to cause the stamp/label to adhere to the surface where it is being applied, said guide means includes a plurality of spaced posts having one end attached to said outer wall extending laterally of said wall and being spaced therefrom for defining a slot for receiving said backing sheet, said guideposts are generally cylindrically in shape and are located on said outer wall and define feet for supporting said dispenser in an upright position, a plurality of tabs formed on one edge of said outer wall and adjacent to said loading end for holding said roll in said pocket, and one of said tab extends radially into said pocket a distance further than the other of said tabs.

2. A stamp/label dispenser as claimed in claim 1 wherein said dispenser includes a back wall diametrically opposed to the loading portion of said dispenser and having a viewing surface adapted to include indicia or label.

3. A stamp/label dispenser as claimed in claim 1 including a plurality of axially spaced projections extending laterally on the top surface of said curved outer wall located to accommodate the placing of the thumb of the hand of the user when said stamp/label dispenser is being used.

4. A stamp/label dispenser as claimed in claim 1 wherein the other longer portion of said curved outer wall includes a curved surface for allowing the user to apply pressure to the stamp/label as it is being applied to the intended surface.

* * * * *